US007650916B2

(12) United States Patent
Clüsserath

(10) Patent No.: US 7,650,916 B2
(45) Date of Patent: Jan. 26, 2010

(54) CONTAINER FILLING ELEMENT FOR OPEN-FILLING OF CONTAINERS

(75) Inventor: Ludwig Clüsserath, Bad Kreuznach (DE)

(73) Assignee: KHS Maschinen- und Anlagenbau AG, Dortmund (DE)

( * ) Notice: Subject to any disclaimer, the term of this patent is extended or adjusted under 35 U.S.C. 154(b) by 521 days.

(21) Appl. No.: 11/072,634

(22) Filed: Mar. 4, 2005

(65) Prior Publication Data

US 2005/0198921 A1 Sep. 15, 2005

(30) Foreign Application Priority Data

Mar. 6, 2004 (DE) ...................... 10 2004 011 101

(51) Int. Cl.
*B65B 3/30* (2006.01)
*G01F 23/24* (2006.01)

(52) U.S. Cl. ......................... 141/95; 53/503; 73/304 R; 141/198

(58) Field of Classification Search .................. 53/253, 53/331.5, 317, 319, 52, 503, 504; 222/17, 222/64, 65, 67; 141/95, 198; 73/304 R; *B67C 3/04, B67C 3/26; B65B 3/30*
See application file for complete search history.

(56) References Cited

U.S. PATENT DOCUMENTS

| | | | | | |
|---|---|---|---|---|---|
| 2,959,355 | A | * | 11/1960 | Houser | 239/75 |
| 3,263,711 | A | * | 8/1966 | Laub | 141/198 |
| 3,504,205 | A | * | 3/1970 | Sheckler | 141/198 |
| 3,765,147 | A | * | 10/1973 | Ippolito et al. | 53/52 |
| 3,783,912 | A | | 1/1974 | Friendship | |
| 3,797,535 | A | * | 3/1974 | Kaiser | 141/198 |
| 4,246,738 | A | * | 1/1981 | Ono | 53/331.5 |
| 4,279,279 | A | * | 7/1981 | Schevey et al. | 141/198 |
| 4,317,475 | A | * | 3/1982 | Miller et al. | 141/95 |
| 4,386,635 | A | * | 6/1983 | Ahlers et al. | 141/198 |
| 4,513,797 | A | * | 4/1985 | Tompkins, Jr. | 141/198 |
| 4,530,384 | A | * | 7/1985 | Boyes | 141/95 |
| 4,548,020 | A | * | 10/1985 | Rozmus et al. | 53/268 |
| 4,787,427 | A | * | 11/1988 | Bacroix et al. | 141/198 |
| 4,807,673 | A | * | 2/1989 | Tazuke et al. | 141/57 |
| 5,419,378 | A | * | 5/1995 | Law | 141/198 |

(Continued)

FOREIGN PATENT DOCUMENTS

CA 2076173 A1 * 2/1993

(Continued)

OTHER PUBLICATIONS

Machine Translation of JP 6-247495 A1. From JPO website, http://www4.ipdl.inpit.go.jp/Tokujitu/tjsogodbenk.ipdl, Feb. 27, 2009, pp. 1-12.*

(Continued)

*Primary Examiner*—Stephen F Gerrity
(74) *Attorney, Agent, or Firm*—Nils H. Ljungman & Associates

(57) ABSTRACT

A beverage bottling plant for filling bottles with a liquid beverage material having a filling element and a filling machine having such filling elements. The filling elements each have a movable probe which may be moved into a bottle or container to be filled in order to detect the level of liquid, such as a beverage, in the bottle or container.

20 Claims, 8 Drawing Sheets

U.S. PATENT DOCUMENTS

| | | | | | |
|---|---|---|---|---|---|
| 5,437,316 | A * | 8/1995 | McPherson | 141/86 |
| 5,713,403 | A * | 2/1998 | Clusserath et al. | 141/101 |
| 5,727,606 | A * | 3/1998 | Weiss | 141/198 |
| 5,865,225 | A * | 2/1999 | Weiss | 141/198 |
| 6,206,240 | B1 * | 3/2001 | Osgar et al. | 222/39 |
| 6,276,113 | B1 * | 8/2001 | Bernhard | 53/253 |
| 6,474,368 | B2 * | 11/2002 | Clusserath et al. | 141/198 |
| 7,086,566 | B2 * | 8/2006 | Goepfert | 222/64 |
| 7,308,917 | B2 * | 12/2007 | Krulitsch | 141/198 |

FOREIGN PATENT DOCUMENTS

| | | | |
|---|---|---|---|
| CH | 15 498 | | 9/1898 |
| DE | 1122394 | A1 * | 1/1962 |
| DE | 1162711 | A1 * | 2/1964 |
| DE | 1432312 | A1 * | 2/1970 |
| DE | 2727723 | A1 * | 1/1979 |
| DE | 4226813 | A1 * | 2/1994 |
| DE | 42 41 545 | | 6/1994 |
| DE | 296 01 216 | | 4/1996 |
| DE | 201 10 362 | | 8/2001 |
| EP | 02 54 660 | | 1/1988 |
| EP | 0262483 | | 4/1988 |
| EP | 405402 | A2 * | 1/1991 |
| EP | 546347 | A1 * | 6/1993 |
| EP | 0601514 | | 6/1994 |
| EP | 12 15 166 | | 6/2002 |
| FR | 1229174 | A1 * | 9/1960 |
| FR | 2800723 | | 5/2001 |
| JP | 04 0 87 986 | | 3/1992 |
| JP | 05 1 24 697 | | 5/1993 |
| JP | 06247495 | A * | 9/1994 |

OTHER PUBLICATIONS

European Patent Office Search Report for EP1571119A1 and English Translation thereof.

European Patent Office Search Report for application EP05003142 and English Translation, 2 pages, dated May 30, 2005.

* cited by examiner

CONTAINER FILLING ELEMENT FOR OPEN-FILLING OF CONTAINERS

BACKGROUND

1. Technical Field

The present application relates to a beverage bottling plant for filling bottles with a liquid beverage material having a filling element and a filling machine having such filling elements.

2. Background Information

A beverage bottling plant for filling bottles with a liquid beverage filling material can possibly comprise a beverage filling machine with a plurality of beverage filling positions, each beverage filling position having a beverage filling device for filling bottles with liquid beverage filling material. The filling devices may have an apparatus designed to introduce a predetermined volume of liquid beverage filling material into the interior of bottles to a substantially predetermined level of liquid beverage filling material. The apparatus designed to introduce a predetermined flow of liquid beverage filling material further comprises an apparatus that is designed to terminate the filling of the beverage bottles upon the liquid beverage filling material reaching the predetermined level in bottles. There may also be provided a conveyer arrangement that is designed to move bottles, for example, from an inspecting machine to the filling machine. Upon filling, a closing station closes the filled bottles. There may further be provided a conveyer arrangement configured to transfer filled bottles from the filling machine to the closing station. Bottles may be labeled in a labeling station, the labeling station having a conveyer arrangement to receive bottles and to output bottles. The closing station and the labeling station may be connected by a corresponding conveyer arrangement.

The prior art describes open-jet filling systems or filling machines that have advantages from the hygienic and microbiological points of view and in which there is no contact between the respective container or its container mouth and the filling element, i.e. during the filling process the container to be filled with the liquid being bottled is located with its container mouth underneath the dispensing opening of the respective filling element, but with its container mouth at some distance from the filling element.

In such systems, the amount of liquid dispensed can be controlled by means of a volume measurement or weighing system, for example, in which case the respective container can be positioned underneath the dispensing opening of the filling element on a container carrier that is not equipped for vertical movement. However, systems that can perform the volume measurement and weighing systems are complex and expensive.

In such open-jet filling systems, if the filling level is to be controlled by means of economical electrical probes with probe contacts, it is necessary during the filling process for the respective probe to extend through the mouth of the container into the interior of the container. To make that possible, the prior art has always required elevation components for the container carriers to raise and lower the containers.

OBJECT OR OBJECTS

The object is to create a filling element with which a probe-controlled open-jet filling can be performed, and namely with a simple constructive configuration of the filling machine and/or of the filling system, and in particular without the need for any vertical movement or a raising and lowering of the containers.

The present application teaches that this object can be accomplished with a filling element as disclosed herein below. A filling machine with a rotary construction is also disclosed herein below.

SUMMARY

In one possible embodiment, the filling level is controlled by means of the vertically movable probe which, before the filling process, is in a raised starting position so that the container to be filled can be positioned with its container mouth underneath the dispensing opening of the filling element without the need for a vertical movement of the container carrier. In particular when plastic bottles (PET bottles) are used, the container carrier can be realized so that the bottles can be suspended on it by means of a flange or ring, such as a neck ring, for example, that is provided below the mouth of the bottle and projects beyond the periphery of the neck of the bottle.

Only at the beginning of the filling process, i.e. when the liquid valve is opened, is the probe moved out of its starting position into the measuring position, and is thereby introduced through the container mouth into the container. At the end of the filling process, the at least one probe contact of the probe comes into contact with the surface of the rising liquid in the container, and the probe sends a (probe) signal to an electronic control system, by means of which, after some delay, for example, the liquid valve is shut off.

To move the probe, an actuator element is provided which is activated when the liquid valve is opened. The actuator element can be a pneumatic cylinder, for example, which is then actuated by means of a common control valve with a pneumatic actuator or pneumatic cylinder that effects the opening of the liquid valve.

The above-discussed embodiments of the present invention will be described further hereinbelow. When the word “invention” or “embodiment of the invention” is used in this specification, the word “invention” or “embodiment of the invention” includes “inventions” or “embodiments of the invention”, that is the plural of “invention” or “embodiment of the invention”. By stating “invention” or “embodiment of the invention”, the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Developments of the embodiments are disclosed herein below. The embodiments are explained in greater detail below with reference to the accompanying simplified drawings, each of which shows a filling element 1 as taught by the present application in various phases of operation.

DESCRIPTION OF EMBODIMENT OR EMBODIMENTS

Figure 1A:
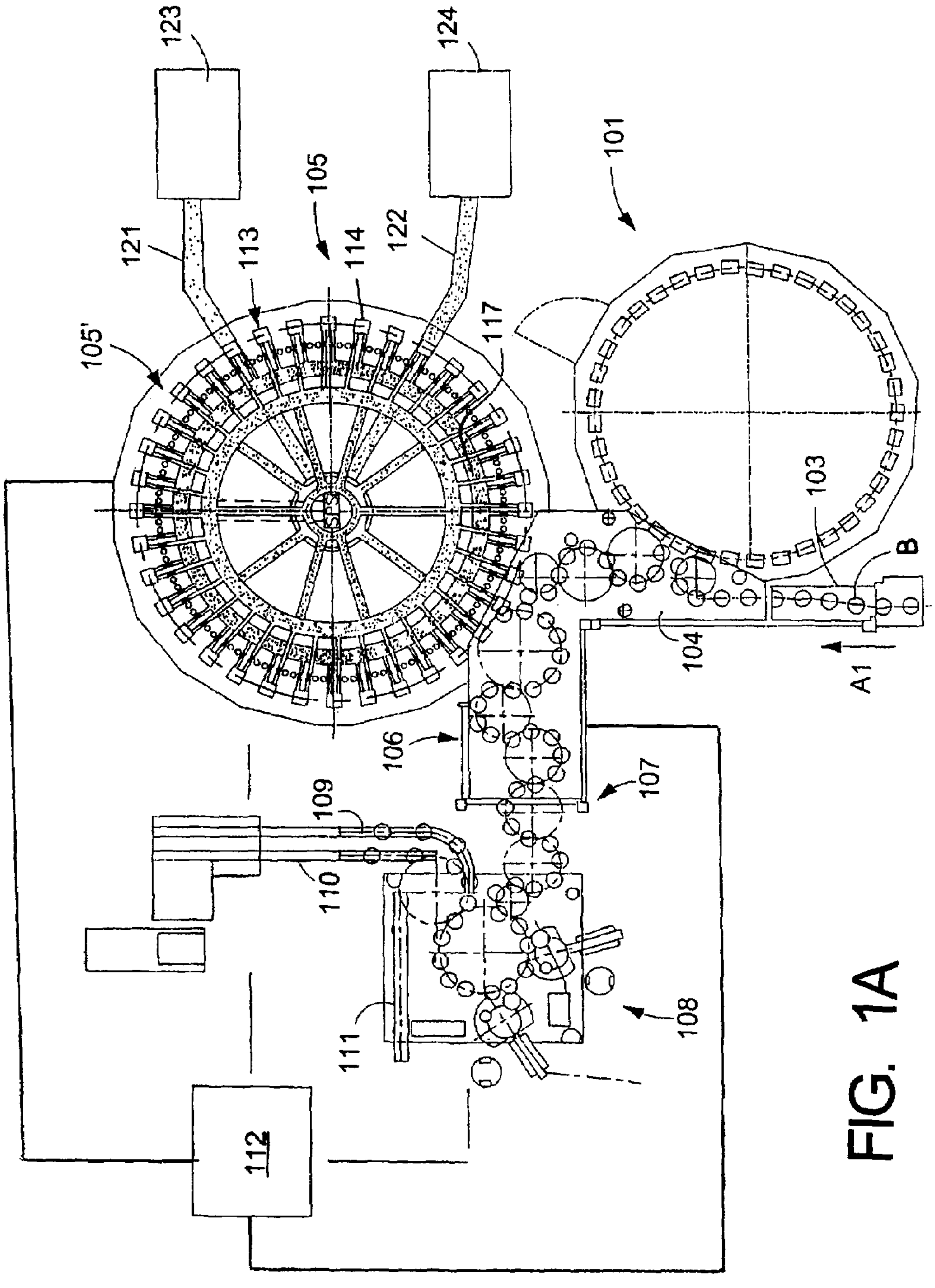
FIG. 1A is a schematic illustration of a container filling plant in accordance with one possible embodiment.

FIG. 1A shows schematically the main components of one possible embodiment example of a system for filling containers, specifically, a beverage bottling plant for filling bottles B with at least one liquid beverage, in accordance with at least one possible embodiment, in which system or plant could possibly be utilized at least one aspect, or several aspects, of the embodiments disclosed herein.

FIG. 1A shows a rinsing arrangement or rinsing station 101, to which the containers, namely bottles B, are fed in the direction of travel as indicated by the arrow A1, by a first conveyer arrangement 103, which can be a linear conveyor or a combination of a linear conveyor and a starwheel. Downstream of the rinsing arrangement or rinsing station 101, in the direction of travel as indicated by the arrow A1, the rinsed bottles B are transported to a beverage filling machine 105 by a second conveyer arrangement 104 that is formed, for example, by one or more starwheels that introduce bottles B into the beverage filling machine 105.

The beverage filling machine 105 shown is of a revolving or rotary design, with a rotor 105', which revolves around a central, vertical machine axis. The rotor 105' is designed to receive and hold the bottles B for filling at a plurality of filling positions 113 located about the periphery of the rotor 105'. At each of the filling positions 103 is located a filling arrangement 114 having at least one filling device, element, apparatus, or valve. The filling arrangements 114 are designed to introduce a predetermined volume or amount of liquid beverage into the interior of the bottles B to a predetermined or desired level.

The filling arrangements 114 receive the liquid beverage material from a toroidal or annular vessel 117, in which a supply of liquid beverage material is stored under pressure by a gas. The toroidal vessel 117 is a component, for example, of the revolving rotor 105'. The toroidal vessel 117 can be connected by means of a rotary coupling or a coupling that permits rotation. The toroidal vessel 117 is also connected to at least one external reservoir or supply of liquid beverage material by a conduit or supply line. In the embodiment shown in FIG. 1A, there are two external supply reservoirs 123 and 124, each of which is configured to store either the same liquid beverage product or different products. These reservoirs 123, 124 are connected to the toroidal or annular vessel 117 by corresponding supply lines, conduits, or arrangements 121 and 122. The external supply reservoirs 123, 124 could be in the form of simple storage tanks, or in the form of liquid beverage product mixers, in at least one possible embodiment.

As well as the more typical filling machines having one toroidal vessel, it is possible that in at least one possible embodiment there could be a second toroidal or annular vessel which contains a second product. In this case, each filling arrangement 114 could be connected by separate connections to each of the two toroidal vessels and have two individually-controllable fluid or control valves, so that in each bottle B, the first product or the second product can be filled by means of an appropriate control of the filling product or fluid valves.

Downstream of the beverage filling machine 105, in the direction of travel of the bottles B, there can be a beverage bottle closing arrangement or closing station 106 which closes or caps the bottles B. The beverage bottle closing arrangement or closing station 106 can be connected by a third conveyer arrangement 107 to a beverage bottle labeling arrangement or labeling station 108. The third conveyor arrangement may be formed, for example, by a plurality of starwheels, or may also include a linear conveyor device.

In the illustrated embodiment, the beverage bottle labeling arrangement or labeling station 108 has at least one labeling unit, device, or module, for applying labels to bottles B. In the embodiment shown, the labeling arrangement 108 has three output conveyer arrangement: a first output conveyer arrangement 109, a second output conveyer arrangement 110, and a third output conveyer arrangement 111, all of which convey filled, closed, and labeled bottles B to different locations.

The first output conveyer arrangement 109, in the embodiment shown, is designed to convey bottles B that are filled with a first type of liquid beverage supplied by, for example, the supply reservoir 123. The second output conveyer arrangement 110, in the embodiment shown, is designed to convey bottles B that are filled with a second type of liquid beverage supplied by, for example, the supply reservoir 124. The third output conveyer arrangement 111, in the embodiment shown, is designed to convey incorrectly labeled bottles B. To further explain, the labeling arrangement 108 can comprise at least one beverage bottle inspection or monitoring device that inspects or monitors the location of labels on the bottles B to determine if the labels have been correctly placed or aligned on the bottles B. The third output conveyer arrangement 111 removes any bottles B which have been incorrectly labeled as determined by the inspecting device.

The beverage bottling plant can be controlled by a central control arrangement 112, which could be, for example, computerized control system that monitors and controls the operation of the various stations and mechanisms of the beverage bottling plant.

The filling element 1 is used to fill a liquid to be bottled in containers in the form of bottles 2, cans or similar containers, and specifically so that the filling takes place without any contact, i.e. during the filling process the respective bottle 2 is located underneath the filling element and at some distance from it. In the illustrated embodiment, the respective bottle 2 is suspended by means of a flange 2.2 that is provided below its bottle mouth 2.1 on a bottle carrier 3 that is associated with the filling element 1, so that the bottle mouth 2.1 is at some distance in the vertical direction from the filling element.

The filling element 1 is provided with a plurality of essentially identical filling elements on the periphery of a rotor that revolves around a vertical machine axis of a filling machine which is not illustrated in any further detail, or on the periphery of a ring bowl 4 which is part of the rotor and has a bowl interior 5 to hold the liquid being bottled. The bottle carriers are also provided on the rotor.

The interior 5 of a ring bowl or central bowl which has a level control, i.e. it is filled to a specified level N with the liquid being bottled, is in communication with the upper end of a liquid duct 7 that is realized in a housing 6 of the filling element 1. The lower end of the liquid duct 7 forms a dispensing opening 8 on the underside of the filling element 1 or on a housing segment 6.1 located there, through which the liquid being bottled flows as the respective bottle 2 is being filled. Between the upper end of the liquid duct 7 and the dispensing opening 8 there is a liquid valve 9 which is formed by the valve body 10 and a valve surface 11 of the liquid duct 7 that interacts with the valve body 10 and/or with a valve body seal.

Figure 2:
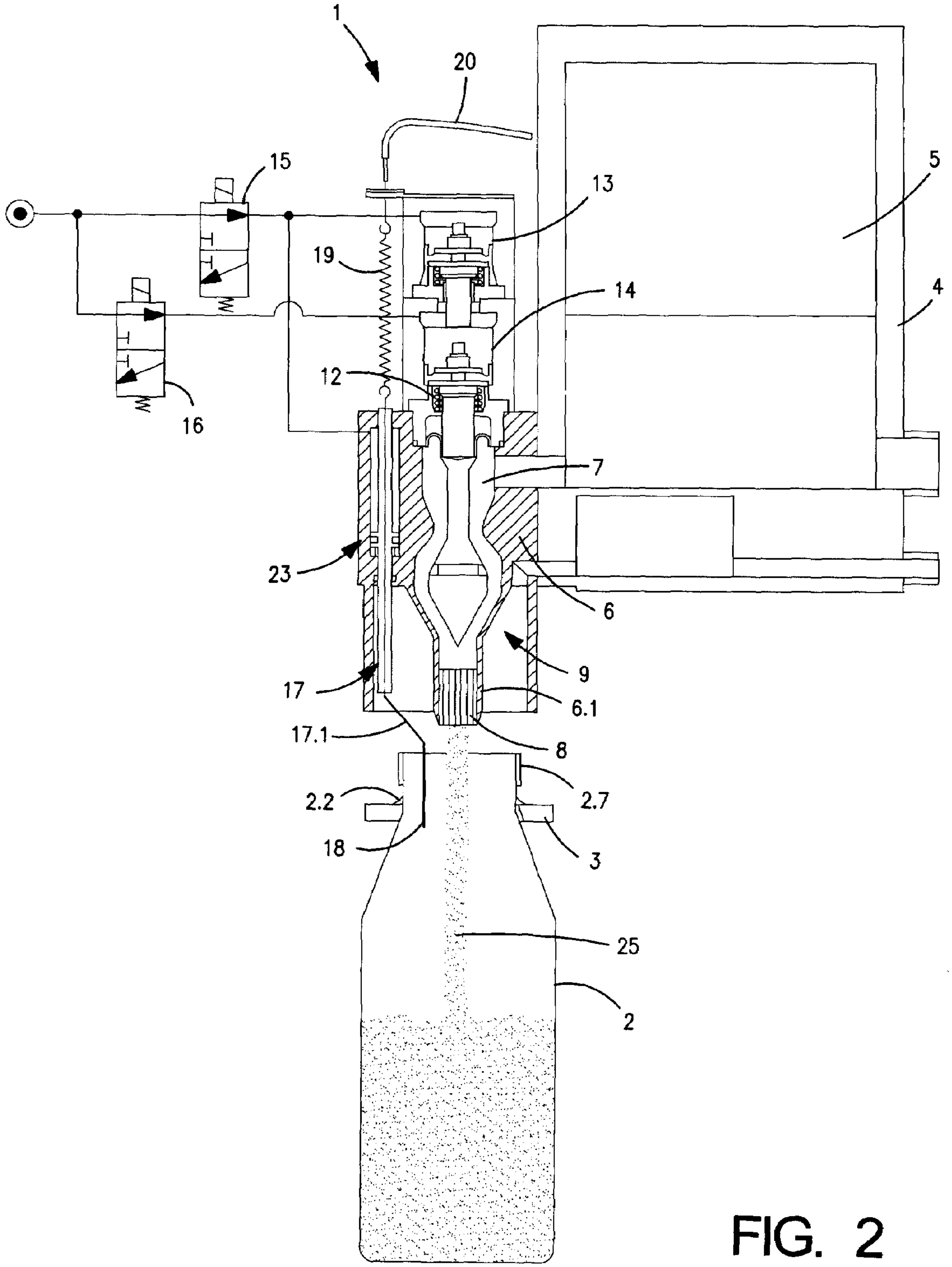
FIG. 2 is similar to FIG. 1 and shows a bottle being filled by a filling element.

In the illustrated embodiment, the liquid valve 9 or its valve body is prestressed into the closed position by a closing spring 12. By means of a pneumatic actuator device that interacts with the valve body 10, the valve body 10 can be moved to open the liquid valve 9 downward from the closed starting position in the vertical direction or in the direction of a filling element axis FA, and specifically in the illustrated exemplary embodiment into two different opening positions, so that in a first opening position of the valve body 10, the liquid valve has a reduced flow cross section for slow filling at the beginning of the respective filling process or for a decelerated filling at the end of the respective filling process, and in a second opening position which is illustrated in FIG. 2 has an enlarged cross section for a rapid filling.

The pneumatic actuator device thereby comprises two pneumatic cylinders 13 and 14 that are arranged so that they act in series, whereby the activated cylinder 13 moves the valve body 10 into the first opening position (with the reduced flow cross section) and the cylinder 14, which is actuated in addition to the cylinder 13, moves the valve body 10 into the second opening position, and namely against the restoring force of the closing spring 12.

The two pneumatic cylinders 13 and 14 are actuated by means of respective electrically actuated control valves 15 and 16 which are provided separately for each filling element 1 of the filling machine, and of which the control valve 15 is associated with the pneumatic cylinder 13 and the control valve 16 is associated with the pneumatic cylinder 14.

To achieve a level-controlled filling of the respective bottle in spite of the contactless filling system, an axially movable probe 17 is also provided in the housing 6 of the filling element 1. The probe 17, which is oriented with its axis essentially parallel to the vertical axis FA but is radially offset from said vertical axis, forms on its lower end a probe tip 18 that has at least one exposed electrical contact that causes the probe signal to be sent when said electrical contact is immersed in the surface of the liquid being bottled.

By means of a tension spring which is engaged on the upper end of the probe 17 that is farther from the probe tip 18, the probe 17 is held in a raised starting position in which the probe tip 18 is at a level that is higher than the level of the dispensing opening 8. In the illustrated exemplary embodiment, the tension spring 19 also acts as a physical and/or electrical connection between a conductor of the probe 17 which is in communication with a probe contact and an external probe connecting line 20. If an additional probe contact is provided, this additional contact is connected by means of an additional conductor, e.g. with the housing 6 which is made of an electrically conducting material and is thus connected to the ground connection of the electronic system.

The probe 17 is realized over a portion of its length in the form of a piston rod 21, which projects on both ends beyond a piston 22 and can move axially on both ends in a cylinder 23 with a cylinder chamber 24 that is realized in the housing 6, i.e. in the direction of the filling element axis FA. In the cylinder space 24 that contains the piston 22, above the piston 22 a partial space is formed which is in communication with the output of the control valve 15, with which the top pneumatic cylinder 13 is controlled.

Figure 1:
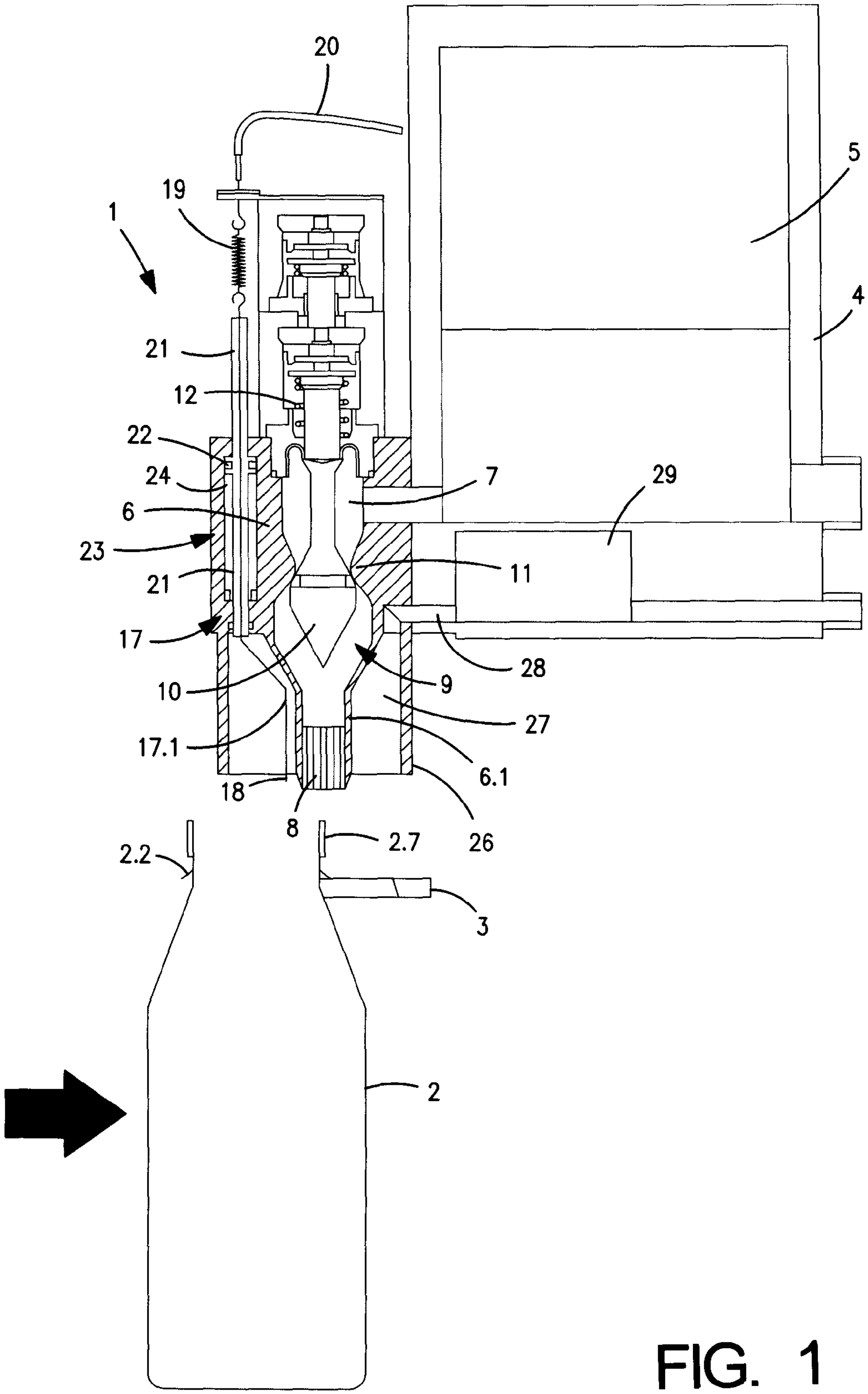
FIG. 1 shows a filling element and a filling machine according to one possible embodiment.

To fill the respective bottle 2, the bottle is moved over a bottle inlet of the filling machine to underneath the respective filling element 1, so that the bottle 2 is then held suspended on the bottle carrier 3, and specifically with the bottle mouth 2.1 at some distance from the filling element 1 (FIGS. 1 and 2). The control valves 15 and 16 are in their closed position.

As the rotor continues its rotational movement, the control valve 15 is opened by the electronic control system, which is not shown, as a result of which on one hand the pneumatic cylinder 13 is activated and the liquid valve 9 is moved into the first opening position for a slow filling of the bottle, and simultaneously the cylinder space 24 of the cylinder 23 above the piston 22 is pressurized with compressed air, so that the probe 17 is moved out of its starting position against the action of the tension spring 19 downward into the measuring position in which the probe 17 extends with its probe tip 18 through the bottle mouth 2.1 into the interior of the bottle 2. The liquid being bottled flows downward in the form of an open jet 25 into the bottle 2. The air that is displaced by the liquid being bottled exits the bottle 2 at the bottle mouth 2.1 between the edge of said mouth and the jet 25 of liquid.

For the subsequent fast filling, the control valve 16 is also opened, so that the liquid valve 9 is moved by the now also activated pneumatic cylinder 14 into the second open position for the fast filling. At the end of the fast filling, the control valve 16 is then closed in a controlled manner and the pneumatic cylinder 14 is deactivated to initiate a slower filling, before the liquid level in the bottle 2 reaches the probe tip 18. Because the control valve 15 is still open, the probe 17 is still in its measuring position. As soon as the level of the liquid in the bottle has reached the probe tip 18, the probe signal that is thereby generated causes a closing of the control valve 15 either immediately or after some delay, as a result of which the liquid valve 19 closes, and as a result of the disappearance of the pressure in the upper portion of the cylinder space 24, the probe 17 is also pulled back into its starting position by the force of the tension spring 19.

Figure 2A:
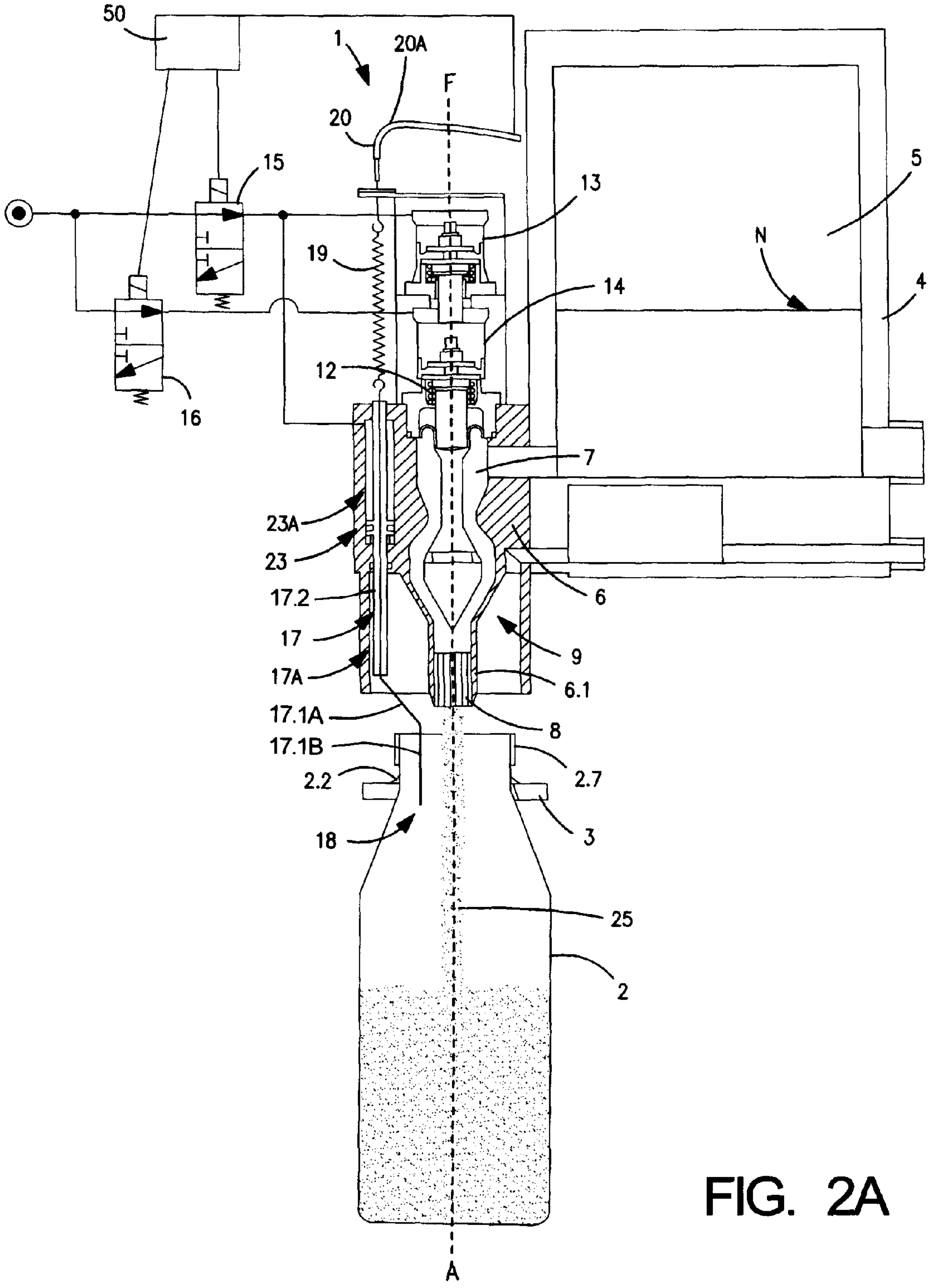
FIG. 2A is similar to FIG. 2 and shows further details according to one possible embodiment.

FIG. 2A is similar to FIG. 2, and shows more details according to one possible embodiment. In this possible embodiment, the external probe connecting line 20 could be insulated with electrical insulation 20A to prevent electrical shorts. The cylinder 23 could be insulated with an electrically insulated sleeve 23A to prevent electrical shorts. The probe 17 could also be insulated with an electrically insulated sleeve 17A to prevent electrical shorts. In the embodiment shown in FIG. 2A, the movable probe 17 comprises a first portion 17.1B that is substantially parallel to and radially offset from the vertical axis A of the filling device 1. The movable probe 17 also comprises a third portion 17.2 substantially parallel to and radially offset from the vertical axis A of the filling device 1, and a second portion 17.1A disposed at an obtuse angle relative to the third portion 17.2. The first portion 17.1B is connected to and below the oblique second portion 17.1A. An exposed electrical contact is located on a lower end portion of the first portion 17.1B, such as the tip 18. During filling, the first portion 17.1B is positioned between the flow of liquid and the inside surface of the container.

In one possible embodiment according to FIG. 2A, the external probe connecting line 20 could be connected to a sensing and actuating circuit 50. The sensing and actuating circuit 50 could also be connected to the control valves 15 and 16. In this possible embodiment, when the liquid being bottled comes into contact with the tip of the probe 17, a signal may be sent to the sensing and actuating circuit 50. The sensing and actuating circuit 50 could then send a signal to the control valves 15 and 16 in order to stop the flow of liquid into the bottle being filled.

Figure 2B:
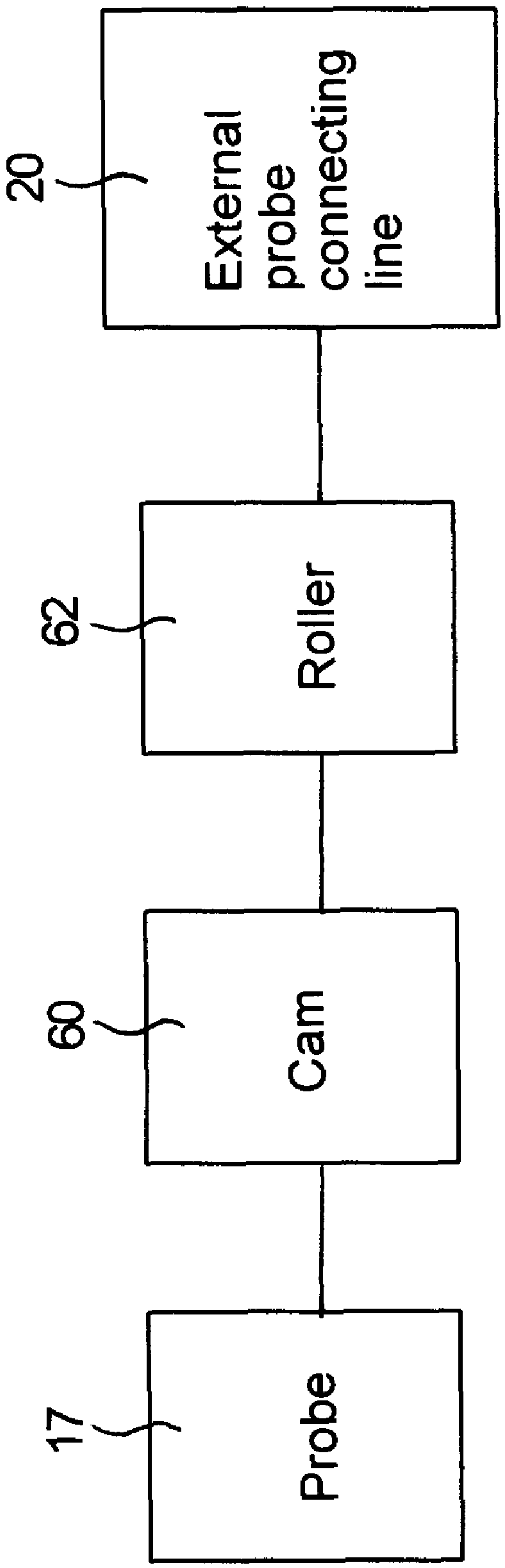
FIG. 2B is a box diagram of a cam and control roller arrangement according to another possible embodiment.

FIG. 2B is a box diagram showing a cam and control roller arrangement according to another possible embodiment. In this possible embodiment, a cam 60 and control roller 62 are connected to the probe 17 and are configured to move the probe 17.

One special feature of the filling element 1 is therefore that to measure the level of the liquid being filled into the bottle, an axially movable probe 17 is provided which is moved only for the actual filling process out of a starting position above the dispensing opening 8 into the respective bottle 2, and that the movement of the probe 17 is controlled by means of the control valve 15, which is also used to control the liquid valve 9, so that the movement of the probe 17 from the starting position into the measuring position and back out of the measuring position occurs necessarily with the opening and closing of the liquid valve 9, and no additional functional components are required for the control of the probe 17.

For an additional and completely consistent variant realization of the present application, the up and down movements of the probe 17 can be effected by a cam and a control roller that is located on the probe 17 and is effectively connected with the cam.

In one preferred configuration of one possible embodiment, the up and down movements of the probe 17 take place in the direction of or parallel to the vertical axis of the filling element. In the context of additional variant configurations, the present application teaches that the up and down movements do not take place in the direction of or parallel to the vertical axis of the filling element but at any arbitrary angle with respect to said axis.

It goes without saying that the realization of additional variants not explicitly described or illustrated here for the movement and/or configuration of the probe (17), of the filling element and/or of the filling machine will not necessary go beyond the scope of protection of the present application.

As the accompanying figures also show, the filling element 1 has, on the underside, a wall 26 that concentrically surrounds the filling element axis FA. This wall forms a ring-shaped open space 27 on the underside of the filling element, which space also encloses, in the manner of a ring, the tubular segment 6.1 of the filling element 1 that has the dispensing opening 8 and in which the probe 17 with a lower segment 17.1 is held. The space 27 is in communication by means of a connection 28 with a common ring bowl 29 that concentrically surrounds the vertical axis of the filling machine and is common to all the filling elements 1 of the filling machine, and in the illustrated exemplary embodiment is located underneath the ring bowl 4. The space 27 can be closed by a cover 30 for a CIP cleaning, during which the liquid cleaning medium used flows through the open liquid valve 9, for example, through the interior 5 of the ring bowl 4 into the space closed by the cover 30 and from there into the ring-shaped space 29, from which the cleaning medium is then discharged by means of a corresponding line. During this CIP cleaning, only the control valve 16 is opened and thus only the pneumatic cylinder 14 is activated, so that the probe 17 remains in its starting position and the lower portion of the probe 17 that has the probe tip 18 and is located in the closed space 27 is also cleaned, among other things, during this CIP cleaning.

Figure 3:
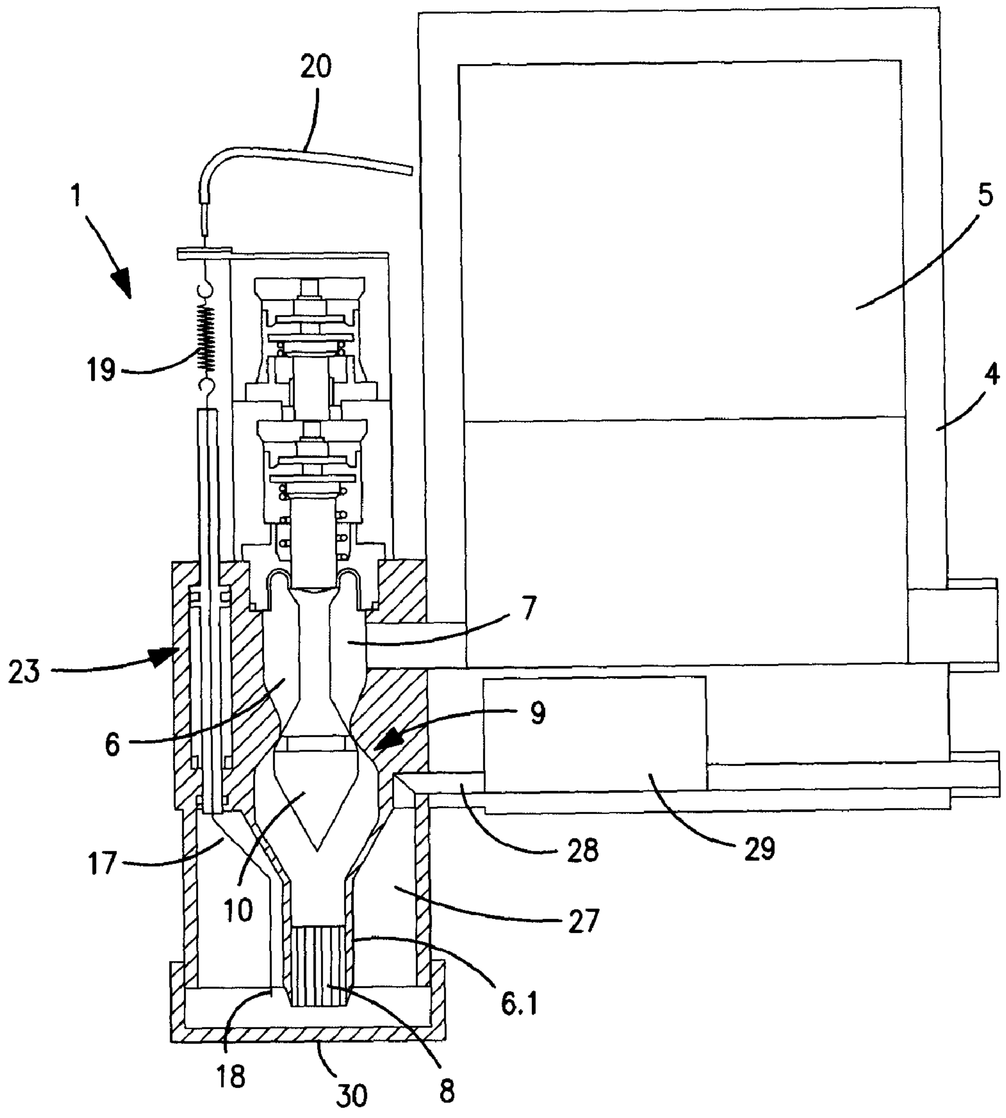
FIG. 3 is similar to FIG. 1 and shows a filling machine according to one possible embodiment in a position to be cleaned.

FIG. 3 shows one possible embodiment of a filling machine in a position for CIP cleaning. The space 27 is closed by a cover 30 so the filling machine and filling element may be cleaned as described above.

The present application has been described above on the basis of one exemplary embodiment. It goes without saying that numerous variations and modifications can be made without thereby going beyond the teaching of the present application. For example, it is possible to make the probe 17 adjustable and to move it to various defined levels, to thereby made adjustments for the filling level of different bottles or containers.

Figure 4:
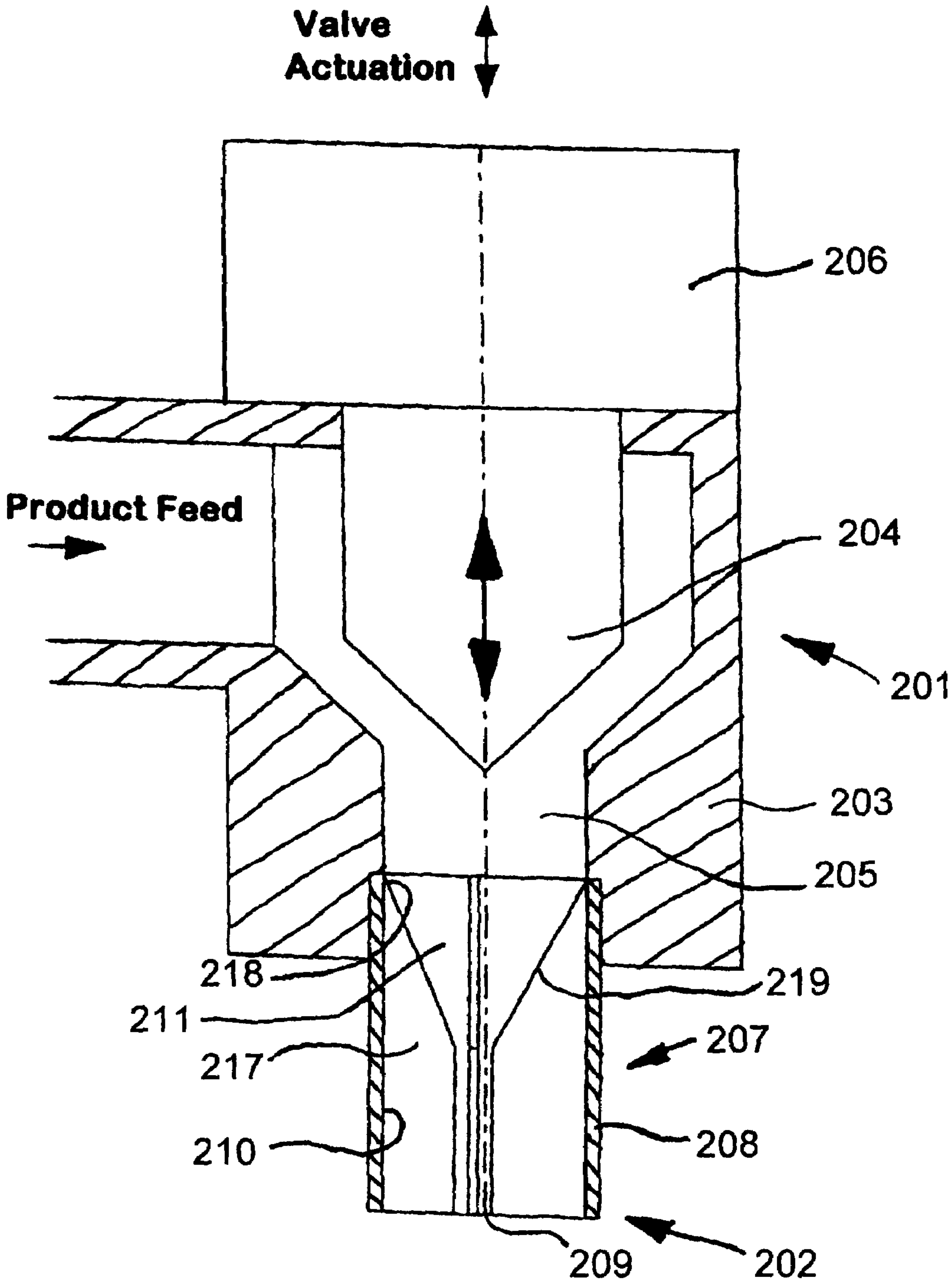
FIG. 4 is a longitudinal section through a filling valve that can be used for the bottling of liquids.

FIG. 4 is shown in the form of a simplified drawing of an exemplary embodiment in the form of an open-jet filling valve 201, in which, during the filling process, the containers to be filled remain at some distance from the filler pipe or the actual exit plane 202 of the liquid. The filling valve 201 comprises a valve housing 203 with a liquid channel 205 that can be closed by a valve body 204. An adjustment device 206 for the valve body 204 is located above the valve body 204. In the lower end of the liquid channel 205 there is a gas cutoff 207. This gas lock is mounted on the filler tube so that it can be removed or replaced as necessary. The tube 207 is realized in the form of a flow element 208 connected with the liquid channel 205 and has a plurality of channels 209 that run parallel to the flow direction. These channels begin on the inner cylindrical surface 210 of the flow element 208 and extend from there a sufficient distance into the vicinity of the flow opening 211 until they meet the adjacent additional open channels 212 or transition into the adjacent open channels. In this manner, all the channels 209, 212 form a common opening, the cross section of which expands.

Figure 5:
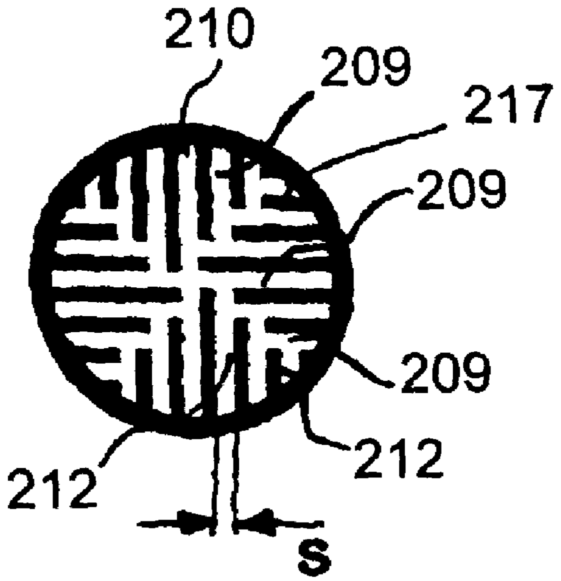
FIG. 5 is a cross section through a gas cutoff.

In the gas cutoff 207 illustrated in cross section in FIG. 5, the channels are directed from four sides 213-216 that are oriented at right angles to one another into the vicinity of the flow opening 211. With a geometric opening selected in this way, the channels 209, 212 meet one another at right angles. However, other geometric arrangements are also conceivable, e.g. proceeding from three sides, so that the channels 209, 212 transition into one another at an angle other than a right angle.

Figure 6:
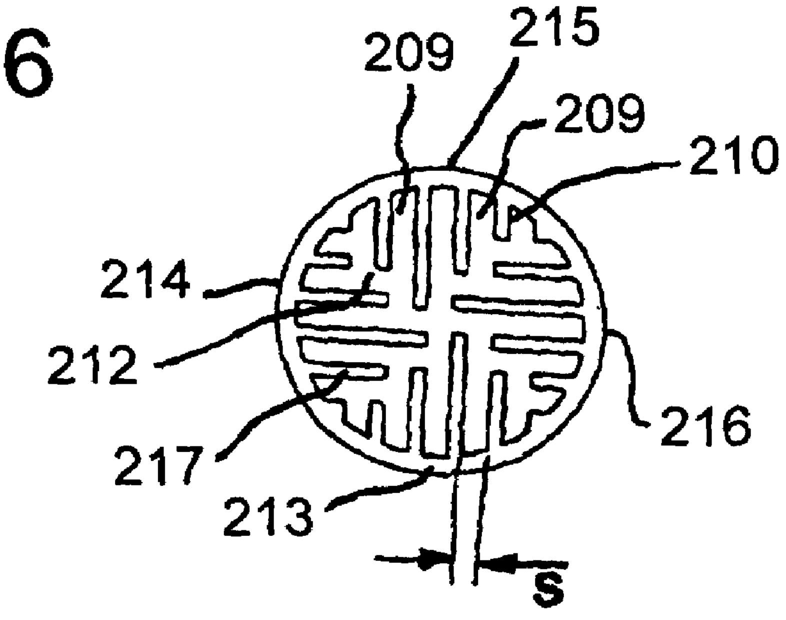
FIG. 6 is a cross section through a gas cutoff with enlarged channels.

The channels are formed by fins 217 that project from the inner cylindrical surface of the flow opening 211 and are located at some distance from one another. These fins, as shown in FIG. 4, run downward from the upper starting point 218 at an angle (angle 219) toward the center, as a result of which, among other things, on account of the funnel effect that is created, there is a self-cleaning of the interior and of the channels during the bottling of beverages that contain fruit pulp or solid matter. In the illustrated exemplary embodiment, the slanted length of the fins 217 equals approximately one-half the total length of the fins. Depending on the product being bottled and the task at hand, other length ratios can also be used. Instead of a slanted section, round, parabolic or other shapes and configurations or combinations thereof can be provided. The channel widths S are equal to one another, so that there is a calm and non-turbulent flow of the liquid being bottled. As shown in FIG. 6, other channel and/or fin widths can be used for different liquids. The jet of liquid being bottled thereby remains laminar and stable, even with a changing volume flow, which minimizes splashing and dripping during the open jet bottling process.

German Application No. 10 2004 013 211.9, entitled "Füliventil zum Abfüllen von Flüssigkeiten in Behälter," filed on Mar. 17, 2004, and having inventor Dieter Rudolf Krulitsch, and the English translation thereof, is hereby incorporated by reference as if set forth in its entirety herein.

One possible embodiment of the present application teaches a filling element for the contactless filling of containers with a liquid, there is a probe that determines the fill level and can be moved by a probe actuator between a starting position in which the probe is located outside the container and a measuring position in which the probe extends through the container opening into the container.

One feature or aspect of an embodiment is believed at the time of the filing of this patent application to possibly reside broadly in a a beverage bottling plant for filling beverage bottles with liquid beverage material, said beverage bottling plant comprising: a beverage bottle cleaning machine being configured and disposed to clean beverage bottles; a feed arrangement to supply beverage bottles to said beverage bottle cleaning machine; a rotary beverage filling machine being configured and disposed to fill beverage bottles with liquid beverage material; said beverage filling machine comprising a rotor that rotates about a vertical machine axis; said beverage filling machine comprising a plurality of beverage filling elements for filling beverage bottles with liquid beverage material disposed on the periphery of said rotor; at least one storage unit being configured and disposed to store a supply of liquid beverage material; at least one supply line being configured and disposed to connect said at least one storage unit to said beverage filling machine to supply liquid beverage material to said beverage filling machine; a first conveyer arrangement being configured and disposed to move beverage bottles from said beverage bottle cleaning machine into said beverage filling machine; said first conveyer arrangement comprising a star wheel structure; a beverage bottle closing machine being configured and disposed to close tops of filled beverage bottles; a second conveyer arrangement being configured and disposed to move filled beverage bottles from said beverage filling machine into said beverage bottle closing machine; said second conveyer arrangement comprising a star wheel structure; a beverage bottle labeling machine being configured and disposed to label filled, closed beverage bottles; a third conveyor arrangement being configured and disposed to move filled, closed beverage bottles from said beverage bottle closing machine into said beverage bottle labeling machine; said third conveyer arrangement comprising a star wheel structure; a beverage bottle packing station being configured and disposed to package labeled, filled, closed beverage bottles; a fourth conveyor arrangement being configured and disposed to move labeled, filled, closed beverage bottles from said beverage bottle labeling machine to said beverage bottle packing station; said fourth conveyer arrangement comprising a linear conveyor structure being configured and disposed to arrange beverage bottles in groups for packing; said beverage filling machine comprising a plurality of filling elements disposed on the periphery of the rotor; each of said filling elements comprising: a dispensing opening being configured and disposed to permit the flow of liquid through said dispensing opening and into a bottle to be filled disposed below and a distance from and not in contact with said dispensing opening; a liquid duct being configured and disposed to permit the flow of liquid from a liquid reservoir to said dispensing opening; a housing being configured and disposed to house said liquid duct; a liquid valve being disposed in said liquid duct to control the flow of liquid to said dispensing opening; a valve actuating arrangement being configured and disposed to open and close said liquid valve; a movable probe being configured and disposed to detect a level of liquid in a bottle upon filling; a probe-moving arrangement being configured and disposed to move said movable probe between a starting position in which said probe is outside a bottle to be filled, and a measuring position in which said probe extends into a bottle to be filled.

Another feature or aspect of an embodiment is believed at the time of the filing of this patent application to possibly reside broadly in a filling machine with a rotary construction for the filling of bottles or similar containers with a liquid, said filling machine comprising: a plurality of filling elements disposed on a rotor that rotates around a vertical machine axis; each of said filling elements comprising: a dispensing opening being configured and disposed to permit the flow of liquid through said dispensing opening and into a bottle to be filled disposed below and a distance from and not in contact with said dispensing opening; a liquid duct being configured and disposed to permit the flow of liquid from a liquid reservoir to said dispensing opening; a housing being configured and disposed to house said liquid duct; a liquid valve being disposed in said liquid duct to control the flow of liquid to said dispensing opening; a valve actuating arrangement being configured and disposed to open and close said liquid valve; a movable probe being configured and disposed to detect a level of liquid in a bottle upon filling; a probe-moving arrangement being configured and disposed to move said movable probe between a starting position in which said probe is outside a bottle to be filled, and a measuring position in which said probe extends into a bottle to be filled.

Yet another feature or aspect of an embodiment is believed at the time of the filing of this patent application to possibly reside broadly in a filling element for a bottle filling machine in a bottle filling plant, said filling element comprising: a dispensing opening being configured and disposed to permit the flow of liquid through said dispensing opening and into a bottle to be filled disposed below and a distance from and not in contact with said dispensing opening; a liquid duct being configured and disposed to permit the flow of liquid from a liquid reservoir to said dispensing opening; a housing being configured and disposed to house said liquid duct; a liquid valve being disposed in said liquid duct to control the flow of liquid to said dispensing opening; a valve actuating arrangement being configured and disposed to open and close said liquid valve; a movable probe being configured and disposed to detect a level of liquid in a bottle upon filling; a probe-moving arrangement being configured and disposed to move said movable probe between a starting position in which said probe is outside a bottle to be filled, and a measuring position in which said probe extends into a bottle to be filled.

Another feature or aspect of an embodiment is believed at the time of the filing of this patent application to possibly reside broadly in a filling element for filling bottles or similar containers with a liquid, with a liquid duct realized in a housing of the filling element and emptying into a dispensing opening for the liquid being bottled, with a liquid valve in the liquid duct that can be controlled by at least one actuator element, and with a probe that determines the filling level, characterized by the fact that when the filling element is realized for contactless filling, in which the container is located underneath the dispensing opening with its container mouth at some distance from the filling element, the probe can be moved by a probe actuator between a starting position in which the probe is outside the container, and a measuring position in which the probe extends through the bottle mouth into the container.

Another feature or aspect of an embodiment is believed at the time of the filing of this patent application to possibly reside broadly in a filling element, characterized by the fact that the probe is an electrical probe which has at least one probe contact on one probe end.

Yet another feature or aspect of an embodiment is believed at the time of the filing of this patent application to possibly reside broadly in a filling element, characterized by spring means that apply a bias force to hold the probe in its starting position.

Still another feature or aspect of an embodiment is believed at the time of the filing of this patent application to possibly reside broadly in a filling element, characterized by the fact that the at least one actuator element for the liquid valve and/or the probe actuator are pneumatic actuator elements, such as pneumatic cylinders, for example.

A further feature or aspect of an embodiment is believed at the time of the filing of this patent application to possibly reside broadly in a filling element, characterized by the fact that the at least one actuator element for the liquid valve and the probe actuator are actuated simultaneously to open the liquid valve and to move the probe out of the starting position into the measuring position.

Another feature or aspect of an embodiment is believed at the time of the filing of this patent application to possibly reside broadly in a filling element, characterized by the fact that the at least one actuator element of the liquid valve and the probe actuator are actuated by means of a common control valve.

Yet another feature or aspect of an embodiment is believed at the time of the filing of this patent application to possibly reside broadly in a filling element, characterized by the fact that a bias force is applied by a closing spring to hold the liquid valve in a closed position, and the liquid valve is opened by the at least one actuator element against the action of the closing spring.

Still another feature or aspect of an embodiment is believed at the time of the filing of this patent application to possibly reside broadly in a filling element, characterized by the fact that the actuator element for the liquid valve is formed by two pneumatic actuators or cylinders that are arranged and/or act in series, one of which effects an opening of the liquid valve with a reduced flow cross section, and that a common control valve is provided for this one actuator element and the probe actuator.

A further feature or aspect of an embodiment is believed at the time of the filing of this patent application to possibly reside broadly in a filling element, characterized by the fact that on the underside of the filling element a space is formed that can be closed by a cover for a CIP cleaning, in which space the portion of the probe that forms the probe tip is located.

Another feature or aspect of an embodiment is believed at the time of the filing of this patent application to possibly reside broadly in a filling element, characterized by the fact that the probe is moved by means of a cam and a jockey roller or control roller that is associated with the probe and is effectively connected with the cam.

Yet another feature or aspect of an embodiment is believed at the time of the filing of this patent application to possibly reside broadly in a filling element, characterized by the fact that the probe can be moved into a plurality of defined measuring positions, whereby these measuring positions differ from one another at least in terms of altitude.

Still another feature or aspect of an embodiment is believed at the time of the filing of this patent application to possibly reside broadly in a filling machine with a rotary construction for the filling of bottles or similar containers with a liquid, with a plurality of filling elements provided on a rotor that rotates around a vertical machine axis, characterized by the fact that the filling elements are realized as disclosed herein above.

Still another feature or aspect of an embodiment is believed at the time of the filing of this patent application to possibly reside broadly in a filling machine, characterized by an individual container carrier that is associated with each filling element, on which container carrier the container to be filled is held by means of its container mouth at some distance from the filling element and underneath the dispensing opening.

Some examples of liquid level sensing apparatuses which may possibly be utilized or adapted for use in at least one possible embodiment may possibly be found in the following U.S. Pat. No. 5,885,851, entitled Apparatus for transferring liquid having liquid level sensing function;" No. 5,627,522, entitled "Automated liquid level sensing system;" No. 4,912,976, entitled "Liquid level sensing apparatus;" No. 4,739,658, entitled "Level sensing system;" No. 4,685,332, entitled "Liquid level sensing device;" and No. 4,356,480, entitled "Liquid level sensing circuitry."

The components disclosed in the various publications, disclosed or incorporated by reference herein, may possibly be used in possible embodiments of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

Some examples of bottling systems, which may be used or adapted for use in at least one possible embodiment of the present may be found in the following U.S. Patents assigned to the Assignee herein, namely: U.S. Pat. No. 4,911,285; No. 4,944,830; No. 4,950,350; No. 4,976,803; No. 4,981,547; No. 5,004,518; No. 5,017,261; No. 5,062,917; No. 5,062,918; No. 5,075,123; No. 5,078,826; No. 5,087,317; No. 5,110,402; No. 5,129,984; No. 5,167,755; No. 5,174,851; No. 5,185,053; No. 5,217,538; No. 5,227,005; No. 5,413,153; No. 5,558,138; No. 5,634,500; No. 5,713,403; No. 6,276,113; No. 6,213,169; No. 6,189,578; No. 6,192,946; No. 6,374,575; No. 6,365,054; No. 6,619,016; No. 6,474,368; No. 6,494,238; No. 6,470,922; and No. 6,463,964.

The appended drawings in their entirety, including all dimensions, proportions and/or shapes in at least one embodiment of the invention, are accurate and are hereby included by reference into this specification.

Some examples of filling machines that utilize electronic control devices to control various portions of a filling or bottling process and that may possibly be utilized or possibly adapted for use in at least one possible embodiment of the present application may possibly be found in the following U.S. Pat. No. 4,821,921 issued to Cartwright et al. on Apr. 18, 1989; No. 5,056,511 issued to Ronge on Oct. 15, 1991; No. 5,273,082 issued to Paasche et al. on Dec. 28, 1993; and No. 5,301,488 issued to Ruhl et al. on Apr. 12, 1994.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

Some examples of stepping motors that may possibly be utilized or possibly adapted for use in at least one possible embodiment of the present application may possibly be found in the following U.S. Pat. No. 6,348,774 issued to Andersen et al. on Feb. 19, 2002; No. 6,373,209 issued to Gerber et al. on Apr. 16, 2002; No. 6,424,061 issued to Fukuda et al. on Jul.

23, 2002; No. 6,509,663 issued to Aoun on Jan. 21, 2003; No. 6,548,923 to Ohnishi et al. on Apr. 15, 2003; and No. 6,661,193 issued to Tsai on Dec. 9, 2003.

All, or substantially all, of the components and methods of the various embodiments may be used with at least one embodiment or all of the embodiments, if more than one embodiment is described herein.

Some examples of stepping motors that may possibly be utilized or possibly adapted for use in at least one possible embodiment of the present application may possibly be found in the following U.S. Pat. No. 6,348,774 issued to Andersen et al. on Feb. 19, 2002; No. 6,373,209 issued to Gerber et al. on Apr. 16, 2002; No. 6,424,061 issued to Fukuda et al. on Jul. 23, 2002; No. 6,509,663 issued to Aoun on Jan. 21, 2003; No. 6,548,923 to Ohnishi et al. on Apr. 15, 2003; and No. 6,661,193 issued to Tsai on Dec. 9, 2003.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

Some examples of filling machine cleaning methods and apparatus that may possibly be utilized or possibly adapted for use in at least one possible embodiment of the present application may possibly be found in the following patent publications: U.S. Pat. No. 3,964,526 issued to Sindermann on Jun. 22, 1976; U.S. Pat. No. 5,173,259 issued to Bordini on Dec. 22, 1992; U.S. Pat. No. 5,558,138 issued to Stock et al. on Sep. 24, 1996; German Patent No. DE-PS 30 17 197 issued on Jan. 2, 1987; German Laid Open Patent Application No. 39 27 401 published on Feb. 21, 1991; German Laid Open Patent Application No. 41 09 731 published on Oct. 31, 1991; and European Patent No. 0 644 152 published on Mar. 22, 1995.

Some examples of lifting devices that may possibly be utilized or possibly adapted for use in at least one possible embodiment of the present application may possibly be found in the following patent publications: U.S. Pat. No. 2,535,272 issued to Detrez on Dec. 26, 1950; U.S. Pat. No. 2,642,214 issued to Lippold on Jun. 16, 1953; German Utility Model No. DE-GM 1,923,261 issued on Sep. 9, 1965; German Laid Open Patent Application No. DE-OS 1,532,586 published on Oct. 2, 1969; British Patent No. 1,188,888 issued Apr. 22, 1970; German Laid Open Patent Application No. DE-OS 26 52 910 published on May 24, 1978; German Patent No. DE-PS 26 52 918 issued on Oct. 26, 1978; German Utility Model No. DE-GM 83 04 995 issued on Dec. 22, 1983; German Patent No. DE-PS 26 30 100 issued on Dec. 3, 1981; and German Laid Open Patent Application No. DE-OS 195 45 080 published on Jun. 5, 1997.

All of the patents, patent applications and publications recited herein, and in the Declaration attached hereto, are hereby incorporated by reference as if set forth in their entirety herein.

Some examples of computer systems that may possibly be utilized or possibly adapted for use in at least one possible embodiment of the present application may possibly be found in the following U.S. Pat. No. 5,416,480 issued to Roach et al. on May 16, 1995; No. 5,479,355 issued to Hyduke on Dec. 26, 1995; No. 5,481,730 issued to Brown et al. on Jan. 2, 1996; No. 5,805,094 issued to Roach et al. on Sep. 8, 1998; No. 5,881,227 issued to Atkinson et al. on Mar. 9, 1999; and No. 6,072,462 issued to Moshovich on Jun. 6, 2000.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

Some examples of control valve apparatus that may possibly be utilized or possibly adapted for use in at least one possible embodiment of the present application may possibly be found in the following U.S. Pat. No. 5,406,975 issued to Nakamichi et al. on Apr. 18, 1995; No. 5,503,184 issued to Reinartz et al. on Apr. 2, 1996; No. 5,706,849 issued to Uchida et al. on Jan. 13, 1998; No. 5,975,115 issued to Schwegler et al. on Nov. 2, 1999; No. 6,142,445 issued to Kawaguchi et al. on Nov. 7, 2000; and No. 6,145,538 issued to Park on Nov. 14, 2000.

It will be understood that the examples of patents, published patent applications, and other documents which are included in this application and which are referred to in paragraphs which state "Some examples of . . . which may possibly be used in at least one possible embodiment of the present application . . . " may possibly not be used or useable in any one or more embodiments of the application.

The sentence immediately above relates to patents, published patent applications and other documents either incorporated by reference or not incorporated by reference.

Some examples of electric control valves that may possibly be utilized or possibly adapted for use in at least one possible embodiment of the present application may possibly be found in the following U.S. Pat. No. 4,431,160 issued to Burt et al. on Feb. 14, 1984; and No. 4,609,176 issued to Powers on Sep. 2, 1986.

The corresponding foreign and international patent publication applications, namely, Federal Republic of Germany Patent Application No. 10 2004 011 101, filed on Mar. 6, 2004, having inventor Ludwig Clüsserath, and DE-OS 10 2004 011 101 and DE-PS 10 2004 011 101, are hereby incorporated by reference as if set forth in their entirety herein for the purpose of correcting and explaining any possible misinterpretations of the English translation thereof. In addition, the published equivalents of the above corresponding foreign and international patent publication applications, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Some examples of pneumatic arrangements that may possibly be utilized or possibly adapted for use in at least one possible embodiment of the present application may possibly be found in the following U.S. Pat. No. 6,609,767 issued to Mortenson et al. on Aug. 26, 2003; No. 6,632,072 issued to Lipscomb et al. on Oct. 14, 2003; No. 6,637,838 issued to Watanabe on Oct. 28, 2003; No. 6,659,693 issued to Perkins et al. on Dec. 9, 2003; No. 6,668,848 issued to Ladler et al. on Dec. 30, 2003; and No. 6,676,229 issued to Marra et al. on Jan. 13, 2004.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Some examples of starwheels which may possibly be utilized or adapted for use in at least one possible embodiment may possibly be found in the following U.S. Pat. No. 5,613,593, entitled "Container handling starwheel;" No. 5,029,695, entitled "Improved starwheel;" No. 4,124,112, entitled "Odd-shaped container indexing starwheel;" and No. 4,084,686, entitled "Starwheel control in a system for conveying containers."

The description of the embodiment or embodiments is believed, at the time of the filing of this patent application, to adequately describe the embodiment or embodiments of this patent application. However, portions of the description of the embodiment or embodiments may not be completely applicable to the claims as originally filed in this patent application, as amended during prosecution of this patent application, and as ultimately allowed in any patent issuing from this patent application. Therefore, any statements made relating to the embodiment or embodiments are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the embodiment or embodiments, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. §1.72(b). As stated in 37 C.F.R. §1.72 (b):

> A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The embodiments of the invention described herein above in the context of the preferred embodiments are not to be taken as limiting the embodiments of the invention to all of the provided details thereof, since modifications and variations thereof may be made without departing from the spirit and scope of the embodiments of the invention.

AT LEAST PARTIAL LIST OF TERMS

1 Filling element
2 Bottle
2.1 Bottle mouth
2.2 Flange underneath the bottle mouth
3 Bottle carrier
4 Ring bowl
5 Ring bowl interior
6 Housing of the filling element
7 Liquid duct
8 Dispensing opening
9 Liquid valve
10 Valve body
11 Valve surface
12 Closing spring
13, 14 Pneumatic cylinder
15, 16 Control valve
17 Probe
17.1 Lower section of probe bent at right angle
18 Probe tip
19 Restoring or tension spring
20 Outer probe connecting line
21 Piston rod
22 Piston
23 Auxiliary cylinder for actuation of the probe 17
24 Cylinder space
25 Jet of liquid with liquid valve 9 open
26 Wall
27 Annulus
28 Connection
29 Toroidal chamber
30 Cover for CIP cleaning
FA Filling element axis

What is claimed is:

1. A container filling element for open-filling of containers with a liquid in a container filling machine in a container filling plant, said container filling element being configured to be disposed sufficiently above containers being filled during filling to permit open-filling of containers being filled, said container filling element having a vertical axis and comprising:

a dispensing opening being centrally disposed about the vertical axis;

said dispensing opening being configured to guide a flow of liquid therethrough and out of said container filling element and into a container to be filled;

said dispensing opening being configured to be disposed above and a distance from and not in contact with the mouth of a container to be filled;

a liquid duct being configured and disposed to permit a flow of liquid from a liquid reservoir to said dispensing opening;

a liquid valve being disposed in said liquid duct to control a flow of liquid to said dispensing opening;

a valve actuating arrangement being configured and disposed to open and close said liquid valve;

a movable probe being configured to detect a level of liquid in a container being filled;

said movable probe comprising an elongated, first portion being configured to be disposed within a container to be filled;

said first portion being configured and disposed to be oriented with its longitudinal axis essentially parallel to and radially offset from the vertical axis of said filling element;

said first portion of said movable probe comprising at least one exposed electrical contact being configured to be contacted by a surface of a liquid in a container being filled upon the liquid reaching a predetermined level in the container;

said movable probe being configured to send an electrical signal to said valve actuating arrangement to close said liquid valve and thus terminate filling of the container upon said electrical contact of said first portion being contacted by a liquid;

a probe-moving arrangement being configured and disposed to move said movable probe between a starting position in which said first portion is disposed outside a container to be filled and adjacent said dispensing opening, and a measuring position in which said first portion is disposed inside a container to be filled, a distance from and below said dispensing opening, and between a flow of liquid and an inside surface of a container during filling;

said dispensing opening comprising a plurality of straight, vertically extending walls being configured to be disposed in a flow of liquid flowing through said dispensing opening;

said walls being disposed to form vertically-disposed linear channels there between configured to guide a flow of liquid flowing through said dispensing opening to generate a non-turbulent, laminar flow of liquid flowing through and out of said dispensing opening and into a container to be filled, to thereby essentially prevent liquid in the flow of liquid from splashing out of the flow of liquid and into contact with said electrical contact of said movable probe to thereby essentially prevent erroneous termination of filling of a container to be filled prior to the liquid reaching a predetermined level.

2. The filling element according to claim 1, wherein:

said movable probe comprises a second portion and a third portion;

said second portion is disposed between and to connect said first portion and said third portion;

said first portion is disposed below each of said second portion and said third portion;

said third portion is disposed substantially parallel to and radially offset from the vertical axis of said filling device;

said second portion is disposed at an obtuse angle relative to each of said first portion and said third portion; and said exposed electrical contact is disposed at a lower end portion of said first portion.

3. The filling element according to claim 2, wherein:

said filling element comprises a spring means configured and disposed to apply a bias force to hold said movable probe in said starting position;

said valve actuating arrangement comprises at least one pneumatic cylinder;

said probe-moving arrangement comprises a pneumatic cylinder;

said valve actuating arrangement and said probe-moving arrangement are configured to be actuated substantially simultaneously, to thereby open said liquid valve and substantially simultaneously move said movable probe out of said starting position and into said measuring position;

said filling element comprises a closing spring configured to apply a bias force to hold said liquid valve in a closed position; and said liquid valve is configured to be opened by said valve actuating arrangement against the action of said closing spring.

4. The filling element according to claim 3, wherein:

said valve actuating arrangement comprises first and second pneumatic cylinders that are arranged and/or act in series;

said first pneumatic cylinder is configured to effect an opening of said liquid valve with a first flow cross section;

said second pneumatic cylinder is configured to effect an opening of said liquid valve with a second flow cross section greater than said first flow cross section;

said filling element comprises a common control valve operatively connected to both said valve actuating arrangement and said probe-moving arrangement;

said filling element comprises an outer wall structure disposed to surround a space about said dispensing opening and at least said first portion of said probe in its starting position;

said space enclosed by said outer wall structure is configured to be closed on the bottom thereof by a cover to permit a CIP cleaning; and said probe-moving arrangement is configured to move said probe into a plurality of defined measuring positions, whereby these measuring positions differ from one another at least in terms of altitude.

5. The filling element according to claim 1, in combination with a filling machine, wherein said filling machine comprises:

a rotor configured to rotate about a vertical machine axis;

a plurality of additional filling elements identical to said filling element disposed on the periphery of said rotor; and a plurality of container support structures configured to support and hold containers by the mouths of the containers under and at a distance from a corresponding filling element to permit open-filling of the containers.

6. A container filling element for open-filling of containers with a liquid in a container filling machine in a container filling plant, said container filling element being configured to be disposed sufficiently above containers being filled during filling to permit open-filling of containers being filled, said container filling element having a vertical axis and comprising:

a dispensing opening being disposed about the vertical axis;

said dispensing opening being configured to guide a flow of liquid therethrough and out of said container filling element and into a container to be filled;

said dispensing opening being configured to be disposed above and a distance from and not in contact with the mouth of a container to be filled during filling of the container;

a liquid duct being configured and disposed to permit a flow of liquid from a liquid reservoir to said dispensing opening;

a liquid valve being disposed in said liquid duct to control a flow of liquid to said dispensing opening;

a valve actuating arrangement being configured and disposed to open and close said liquid valve;

a movable probe being configured to detect a level of liquid in a container being filled;

said movable probe comprising an elongated, first portion being configured to be disposed within a container to be filled;

said first portion being configured and disposed to be oriented with its longitudinal axis essentially parallel to and radially offset from the vertical axis of said filling element;

said first portion of said movable probe being configured to be contacted by a surface of a liquid in a container being filled upon the liquid reaching a predetermined level in the container;

said movable probe being configured to send a signal to said valve actuating arrangement to close said liquid valve and thus terminate filling of the container upon said first portion being contacted by a liquid;

a probe-moving arrangement being configured and disposed to move said movable probe between a starting position in which said first portion is disposed outside a container to be filled, and a measuring position in which said first portion is disposed inside a container to be filled and a distance from and below said dispensing opening; and said dispensing opening being configured to generate a non-turbulent flow of liquid flowing through and out of said dispensing opening and into a container to be filled, to thereby minimize liquid in the flow of liquid from splashing out of the flow of liquid and into contact with said first portion of said movable probe to thereby minimize erroneous termination of filling of a container to be filled prior to the liquid reaching a predetermined level.

7. The filling element according to claim 6, wherein:

said filling element comprises a spring means configured and disposed to apply a bias force to hold said movable probe in said starting position;

said valve actuating arrangement comprises at least one pneumatic cylinder; and said probe-moving arrangement comprises a pneumatic cylinder.

8. The filling element according to claim 7, wherein:

said valve actuating arrangement and said probe-moving arrangement are configured to be actuated substantially simultaneously, to thereby open said liquid valve and substantially simultaneously move said movable probe out of said starting position and into said measuring position;

said filling element comprises a closing spring configured to apply a bias force to hold said liquid valve in a closed position; and said liquid valve is configured to be opened by said valve actuating arrangement against the action of said closing spring.

9. The filling element according to claim 8, wherein:

said valve actuating arrangement comprises first and second pneumatic cylinders that are arranged and/or act in series;

said first pneumatic cylinder is configured to effect an opening of said liquid valve with a first flow cross section; and said second pneumatic cylinder is configured to effect an opening of said liquid valve with a second flow cross section greater than said first flow cross section.

10. The filling element according to claim 9, wherein:

said movable probe comprises a second portion and a third portion;

said second portion is disposed between and to connect said first portion and said third portion;

said first portion is disposed below each of said second portion and said third portion;

said third portion is disposed substantially parallel to and radially offset from the vertical axis of said filling device; and said second portion is disposed at an obtuse angle relative to each of said first portion and said third portion.

11. The filling element according to claim 10, wherein:

said filling element comprises a common control valve operatively connected to both said valve actuating arrangement and said probe-moving arrangement;

said filling element comprises an outer wall structure disposed to surround a space about said dispensing opening and at least said first portion of said probe in its starting position;

said space enclosed by said outer wall structure is configured to be closed on the bottom thereof by a cover to permit a CIP cleaning; and said probe-moving arrangement is configured to move said probe into a plurality of defined measuring positions, whereby these measuring positions differ from one another at least in terms of altitude.

12. The filling element according to claim 11, in combination with a filling machine, wherein said filling machine comprises:

a rotor configured to rotate about a vertical machine axis;

a plurality of additional filling elements identical to said filling element disposed on the periphery of said rotor; and a plurality of container support structures configured to support and hold containers by the mouths of the containers under and at a distance from a corresponding filling element to permit open-filling of the containers.

13. The filling element according to claim 6, in combination with a filling machine, wherein said filling machine comprises:

a rotor configured to rotate about a vertical machine axis;

a plurality of additional filling elements identical to said filling element disposed on the periphery of said rotor; and a plurality of container support structures configured to support and hold containers by the mouths of the containers under and at a distance from a corresponding filling element to permit open-filling of the containers.

14. A container filling element for open-filling of containers with a liquid in a container filling machine in a container filling plant, said container filling element being configured to be disposed sufficiently above containers being filled during filling to permit open-filling of containers being filled, said container filling element comprising:

a dispensing opening being configured to guide a flow of liquid therethrough and out of said container filling element and into a container to be filled;

said dispensing opening being configured to be disposed a distance from and not in contact with the mouth of a container to be filled during filling of the container;

a liquid duct being configured and disposed to permit a flow of liquid from a liquid reservoir to said dispensing opening;

a liquid valve being disposed in said liquid duct to control a flow of liquid to said dispensing opening;

a valve actuating arrangement being configured and disposed to open and close said liquid valve;

a movable probe being configured to detect a level of liquid in a container being filled;

said movable probe comprising a first portion being configured to be disposed within a container to be filled;

said first portion of said movable probe being configured to detect a level of a liquid in a container being filled;

said movable probe being configured to send a signal to said valve actuating arrangement to close said liquid valve and thus terminate filling of the container upon said first portion detecting a level of a liquid in a container being filled reaching a predetermined level;

a probe-moving arrangement being configured and disposed to move said movable probe between a starting position in which said first portion of said movable probe is disposed outside a container to be filled, and a measuring position in which said first portion is disposed inside a container to be filled and below said dispensing opening; and said dispensing opening being configured to generate a non-turbulent flow of liquid flowing through and out of said dispensing opening and into a container to be filled, to thereby minimize liquid in the flow of liquid from splashing out of the flow of liquid.

15. The filling element according to claim 14, wherein:

said movable probe comprises a second portion and a third portion;

said second portion is disposed between and to connect said first portion and said third portion;

said first portion is disposed below each of said second portion and said third portion; and said second portion is disposed at an obtuse angle relative to each of said first portion and said third portion.

16. The filling element according to claim 15, wherein:

said filling element comprises a spring means configured and disposed to apply a bias force to hold said movable probe in said starting position;

said valve actuating arrangement comprises at least one pneumatic cylinder; and said probe-moving arrangement comprises a pneumatic cylinder.

17. The filling element according to claim 16, wherein:

said valve actuating arrangement and said probe-moving arrangement are configured to be actuated substantially simultaneously, to thereby open said liquid valve and substantially simultaneously move said movable probe out of said starting position and into said measuring position;

said filling element comprises a closing spring configured to apply a bias force to hold said liquid valve in a closed position; and said liquid valve is configured to be opened by said valve actuating arrangement against the action of said closing spring.

18. The filling element according to claim 17, wherein:

said valve actuating arrangement comprises first and second pneumatic cylinders that are arranged and/or act in series;

said first pneumatic cylinder is configured to effect an opening of said liquid valve with a first flow cross section; and said second pneumatic cylinder is configured to effect an opening of said liquid valve with a second flow cross section greater than said first flow cross section.

19. The filling element according to claim 18, wherein:

said filling element comprises a common control valve operatively connected to both said valve actuating arrangement and said probe-moving arrangement;

said filling element comprises an outer wall structure disposed to surround a space about said dispensing opening and at least said first portion of said probe in its starting position;

said space enclosed by said outer wall structure is configured to be closed on the bottom thereof by a cover to permit a CIP cleaning; and said probe-moving arrangement is configured to move said probe into a plurality of defined measuring positions, whereby these measuring positions differ from one another at least in terms of altitude.

20. The filling element according to claim 14, in combination with a filling machine, wherein said filling machine comprises:

a rotor configured to rotate about a vertical machine axis;

a plurality of additional filling elements identical to said filling element disposed on the periphery of said rotor; and a plurality of container support structures configured to support and hold containers by the mouths of the containers under and at a distance from a corresponding filling element to permit open-filling of the containers.

* * * * *